United States Patent [19]

Lorch

[11] 4,352,369

[45] Oct. 5, 1982

[54] MIXING VALVE FOR LIQUIDS

[76] Inventor: Werner Lorch, Hammergraben 84/1, D-7230 Schramberg, Fed. Rep. of Germany

[21] Appl. No.: 117,415

[22] Filed: Jan. 31, 1980

[30] Foreign Application Priority Data

Feb. 3, 1979 [DE] Fed. Rep. of Germany ....... 2904131

[51] Int. Cl.³ .............................................. F16K 11/08
[52] U.S. Cl. .................................. 137/270; 137/625.41
[58] Field of Search ........................... 137/625.41, 270

[56] References Cited

U.S. PATENT DOCUMENTS

| | | | |
|---|---|---|---|
| 2,911,009 | 11/1959 | Parker | 137/625.41 |
| 3,056,418 | 10/1962 | Adams et al. | 137/625.41 X |
| 3,417,783 | 12/1968 | Manoogian et al. | 137/625.41 |
| 3,674,048 | 7/1972 | Manoogian et al. | 137/625.41 X |
| 3,882,897 | 5/1975 | Manoogian et al. | 137/625.4 |
| 4,243,063 | 1/1981 | Parkison | 137/625.41 X |

FOREIGN PATENT DOCUMENTS

| | | |
|---|---|---|
| 1550391 | 9/1969 | Fed. Rep. of Germany . |
| 1600995 | 4/1972 | Fed. Rep. of Germany . |
| 2246763 | 3/1974 | Fed. Rep. of Germany . |
| 2705165 | 9/1977 | Fed. Rep. of Germany . |
| 2241031 | 3/1975 | France . |

Primary Examiner—Arnold Rosenthal

[57] ABSTRACT

This mixing valve has a spherical plug to be operated by an operating rod, having communicating inlets and outlets which differ from one another each as to number and arrangement, formation and/or in size, so that the operating direction for varying the mixing ratio is reversed when the plug is rotated 180°.

18 Claims, 7 Drawing Figures

MIXING VALVE FOR LIQUIDS

BACKGROUND OF THE INVENTION

The invention relates to a mixing valve for liquids, particularly for sanitary purposes, with a spherical plug and having communicating inlets and outlets, a valve housing having a valve face adapted to the spherical plug and into which issue a discharge pipe and two intake pipes for the liquids to be mixed which can be connected to at least two openings of the spherical plug, and an operating rod connected to the spherical plug and guided in a recess of said plug by means of which the plug is pivotable for varying the quantity of the outflowing liquid and is rotatable for varying the mixing ratio of the inflowing liquids, the inlets and outlets of the spherical plug being arranged in each case homologously to a plane of symmetry passing through the operating rod axis and at right angles to the pivot axis.

Such mixing valves are popular, particularly due to their convenient and easy operation. This is not only due to the fact that they can be operated by one hand, but particularly due to the fact that, without changing the set mixing ratio of the inflowing liquids (e.g. hot and cold water), they can be closed by simply pressing down the operating rod or the knob, grip or handle rigidly connected thereto and can be opened by simply raising the operating rod or the knob, grip or handle rigidly connected thereto. This is advantageous not only in cases where a rapid opening or closing of the valve is desired, but also particularly in those cases where a contamination of the operating rod or its grip (e.g. by dirty hands) or a contamination of the hands by the operating rod or its grip (e.g. in medical practices) is to be avoided.

If mixing valves of this type are to be used for mixing hot and cold water, e.g. as wash basin fittings, they must always be fitted in such a way that the clockwise turning of the operating rod or a clockwise pivoting or rotation of the grip rigidly connected thereto leads to a reduction in the temperature of the outflowing water and a counterclockwise turning of the operating rod or a counterclockwise pivoting or rotation of the grip rigidly connected thereto brings about an increase in the temperature of the outflowing water. However, in the hitherto known mixing valves of the type described hereinbefore, this is only possible if the hot and cold water supply pipes run in a convenient manner, i.e. out of sight of the wash basin user with the cold water pipe to the right and the hot water pipe to the left, because otherwise and without undesired and costly supply pipe crossovers, which are often not possible due to the limited space available, the turning of the operating rod or a pivoting or rotation of the grip rigidly connected thereto in a clockwise direction leads to an increase and not to a decrease of the temperature of the outflowing water.

This problem is particularly serious, e.g. in cases where it is a question of fitting in space-saving manner identical wash basins equipped with identical mixing valves on either side of a wall with connection to a hot and cold water supply pipe arranged in vertically juxtaposed manner within said wall, because out of sight of the wash basin user the hot water supply pipe is to the right of the cold water supply pipe on one side of said wall and to the left thereof on the other side of said wall.

BRIEF SUMMARY OF THE INVENTION

The object of the invention is to obviate these difficulties, i.e. to improve a mixing valve of the type described hereinbefore in such a way that without any crossing of the supply pipes, it can be used both in cases where the hot water supply pipe is to the left of the cold water supply pipe and in cases where the hot water supply pipe is to the right of the cold water supply pipe.

According to the invention, this problem is solved by a mixing valve of the type described hereinbefore, wherein the inlets and outlets of the spherical plug have sections which are arranged at substantially the same latitude of the spherical plug, with reference to is rotation axis passing through the operating rod the inlets and outlets of the spherical plug are interchangeable and the inlets and outlets of the spherical plug differ from one another in such a way that on introducing the spherical plug displaced by 180° about the operating rod axis the direction of movement for changing the mixing ratio is rotated by 180°. For this purpose, the number, arrangement, configuration and/or size of the inlets and outlets of the spherical plug can differ and more detailed reference will be made to this in the following description.

The term "latitude" is understood to mean the spherical plug latitude at which the inlets and outlets or opening sections of this spherical plug are arranged.

According to a preferred embodiment of the mixing valve according to the invention, its spherical plug is essentially constructed as a hollow sphere, which can be manufactured in material-saving manner and has the advantage of bringing about a complete and thorough mixing of the liquids to be mixed in the manner of a mixingchamber.

As stated hereinbefore, the plug of the mixing valve according to the invention has two types of openings or opening sections which, as desired, can serve as inlets or outlets. Preferably, the openings or opening sections are arranged in such a way that the intersection between the plane of symmetry and the degree of latitude occurs at an opening or an opening section on one side of the spherical valve and on the other side occurs in a closed intermediate zone between the two openings or opening sections.

The spherical plug of the mixing valve according to the invention preferably has on one side an even number and on the other side an uneven number of opening sections on the latitude.

On the side of the spherical plug with the even number of openings or opening sections, there are at least two and preferably four thereof and on the other side of the plug, i.e. on the side with the uneven number of openings or opening sections there are at least three thereof.

The cross-sectional area of external openings on the side with the even number of opening sections and the cross-sectional area of the central opening on the side with the uneven number of opening sections preferably corresponds to at least the cross-sectional area of in each case one intake pipe issuing into the valve housing and this will be described in greater detail hereinafter.

On one side and preferably on the side with the uneven number of openings or opening sections, the openings in the spherical plug can be circular. However, on at least one side of the spherical plug and possibly on the side with the even number of openings or opening sections, the openings in the plug preferably have the form of a horizontal rectangle, whose narrow side remote from the plane of symmetry is substantially semi-circular.

According to a preferred embodiment, the openings in the spherical plug on at least one side and preferably the side with the even number of openings or opening sections have in each case the shape of a trapezoid with rounded angles.

The openings in the spherical plug which are closer to the plane of symmetry are preferably made smaller on the side with the even number of openings or opening sections than the openings which are more remote from the plane of symmetry.

The opening or openings in the spherical plug closer to the plane of symmetry can be made larger on the side with the uneven number of openings or opening sections than the openings more remote from the plane of symmetry.

On the side with the uneven number of openings or opening sections, it is possible to provide in place of an uneven number of openings or opening sections a single transversely directed opening, which is substantially circular in the centre and to which are connected preferably lateral oval halves with a smaller arc radius and a detailed description will be given of this hereinafter in connection with the mixing valve according to the invention and the drawings. Reference will also be made to the fact that the intermediate zone between the openings or opening sections on the spherical plug with the even number of opening sections traversed by the plane of symmetry is wider at right angles to the plane of symmetry than the diameter of an intake pipe issuing into the valve housing.

BRIEF DESCRIPTION OF THE DRAWINGS

The invention is described in greater detail hereinafter with reference to preferred but non-limitative embodiments of the mixing valve according to the invention and with reference to the attached drawings, wherein.

DETAILED DESCRIPTION OF THE PREFERRED EMBODIMENTS

Figure 1:
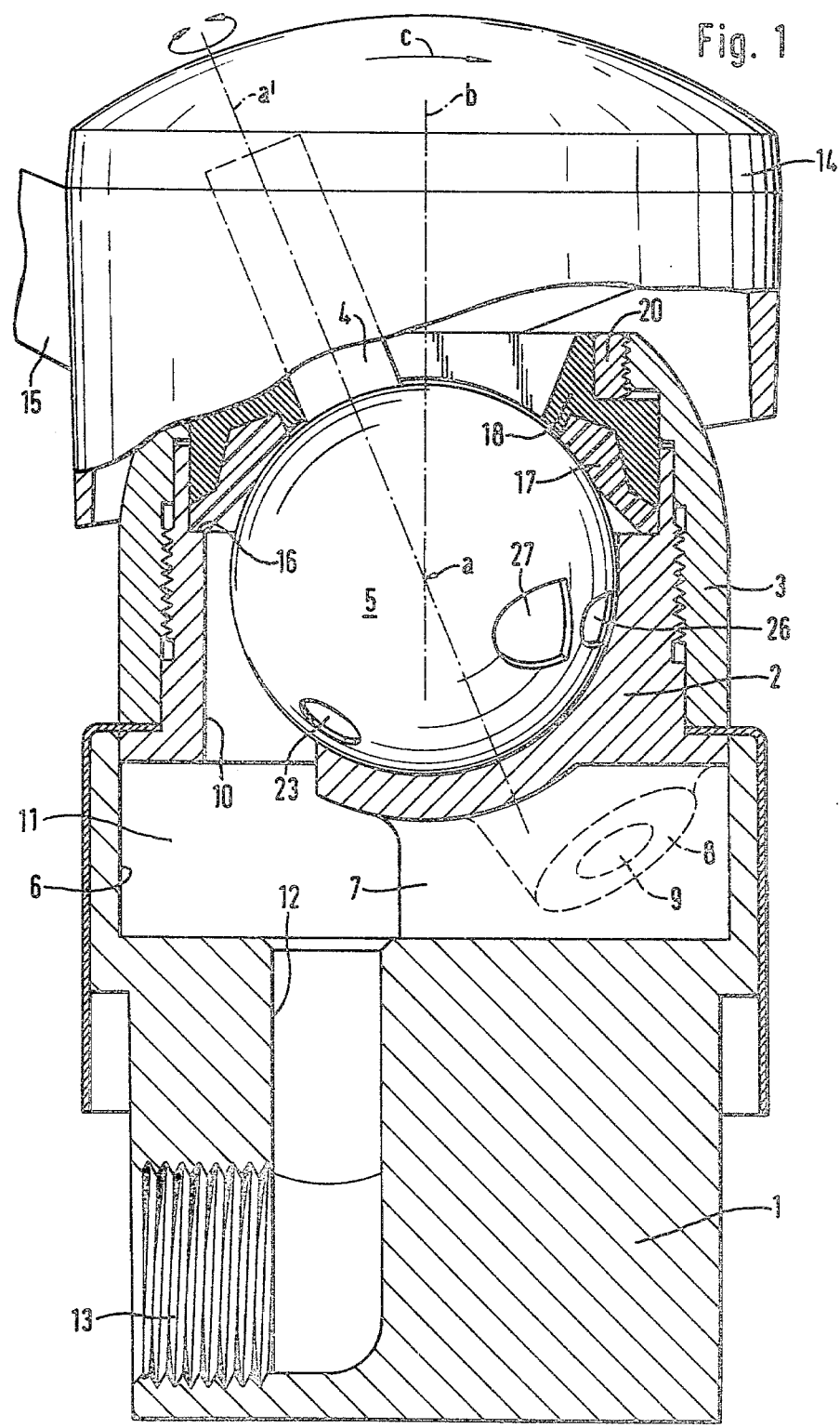
FIG. 1 is a section through a mixing valve according to the invention.

The embodiment of the mixing valve according to the invention shown in FIG. 1 is intended and constructed to be screwed to pipe unions of a hot water supply pipe (shown in phantom) and a cold water supply pipe (not shown) and to be provided with an outlet tap or hose (not shown). This mixing valve essentially comprises four parts, a base part 1, a valve seat insert 2, a cap nut 3 and a spherical plug 5 provided with an operating rod 4.

The sturdily constructed base part 1 has in its upper area a recess 6 into which is inserted from above the valve seat insert 2, the latter being supported via a rib 7 against the bottom of recess 6. The base part 1 and the valve seat insert 2 are tightened and preferably detachably interconnected.

In the upper area of valve seat insert 2, there is an upwardly open, hemispherical recess serving as a seat for the spherical plug 5 and into which issue the three pipes arranged symmetrically with respect to the represented sectional plane. Two of these pipes are directed radially and one eccentrically and their orifices are arranged in star-like manner when viewed from above. The radial pipes are used for the supply of hot or cold water and lead to pipe unions located on the valve seat insert 2 and which are to be connected to correspondingly constructed pipe unions of a hot water or cold water supply pipe. The drawing only shows one of two pipe unions provided on valve seat insert 2, namely hot water pipe union 8 and the hot water supply pipe 9 arranged therein. The third, much larger and vertically directed pipe 10 is used as a discharge pipe and leads into the space 11 formed by the bottom of valve seat insert 2 and from base part recess 6 and from which leads a vertically directed bore 12 provided in the base part 1 and which passes into a horizontal base part bore 13 provided for the connection of a tap or hose adaptor with an internal thread.

Spherical plug 5 is a hollow sphere and has an operating rod 4 rigidly connected thereto. The free end of operating rod 4 is screwed to a cap 14, having a bow-shaped grip 15, which projects laterally with respect to the operator. By pivoting the grip 15, spherical plug 5 can be rotated about the longitudinal axis $a'$ of the operating rod and by raising or lowering grip 5 in the direction of arrow c can be pivoted about a horizontal axis c which is at right angles to the first-mentioned axis and is perpendicular to the paper plane in FIG. 1.

The termination of the hemispherical recess of valve seat insert 2 is formed by a ring shoulder 16 for a gasket 17, which carries a slotted disk 18, whose slot serves as a guide for the operating rod 4. The valve seat insert 2 is provided with an external thread to which is screwed a cap nut 3 having in its upper area internally circulating, stepped profiles. The upper end of the cap nut 3 is provided with an internal thread for an adjusting ring 20 acting on disk 18, whose adjustment regulates the mobility of the spherical plug and the sealing action of gasket 17.

In its lower area remote from the operating rod 4, the spherical plug 5 has openings which form inlets and outlets and are arranged substantially at the same latitude of plug 5 with respect to its rotation axis $a'$ passing through its operating rod 4. These openings are always arranged homologously to a plane of symmetry x passing through the operating rod axis $a'$ and at right angles to the pivot axis a (cf FIG. 2) and, as desired, can serve as inlets or outlets, as will be described in greater detail hereinafter.

Figure 2:
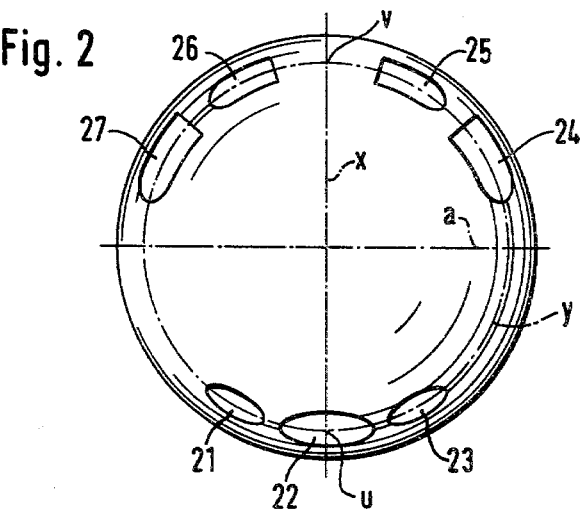
FIG. 2 is the spherical plug of the mixing valve shown in FIG. 1 in the axial direction of the operating rod from below.

In the case of the spherical plug embodiment shown in FIGS. 1 and 2, two types of openings are provided, namely three circular openings 21, 22 and 23 on one side, and on the other side, four openings having the shape of a horizontal rectangle, one narrow side of which is constructed in substantially semi-circular manner. Of the three circular openings 21, 22 and 23, the central opening 22 has a diameter which essentially corresponds to that of the water supply pipes issuing into the spherical plug valve seat and is larger than that of the two adjacent and identically large openings 21, 23. The four openings facing the three circular openings 21, 22, 23 on substantially the same plug latitude y are arranged homologously to a plane of symmetry x passing through the operating rod axis a' and at right angles to the pivot axis a, the distance between the two central openings 25, 26 being larger than the diameter of the water inlets 28, 29 (shown in phantom in FIG. 3) provided in the valve seat and all four openings are substantially semi-circular on their narrow side remote from the plane of symmetry x. The width of the outer openings 24 and 27 substantially corresponds to that of the above-mentioned water inlets, while the length of openings 24 and 27 somewhat exceeds this diameter.

The smaller inner openings 25, 26, which have the same dimensions, have a smaller length and width than the adjacent outer openings 24 and 27. There are an even number of openings in this configuration. The "lower edges" of all seven openings 21 to 27 are on the same spherical plug latitude.

Figure 3A:
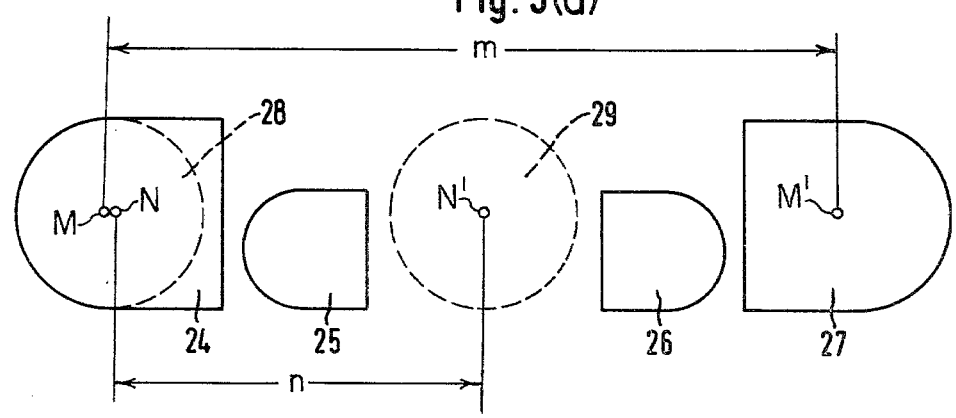
FIGS. 3(a)-(c) are three configuration possibilities for the openings of the spherical plug of a mixing valve according to the invention.
Figure 3B:
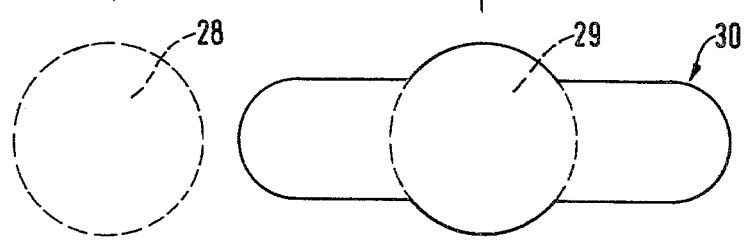
Figure 3C:
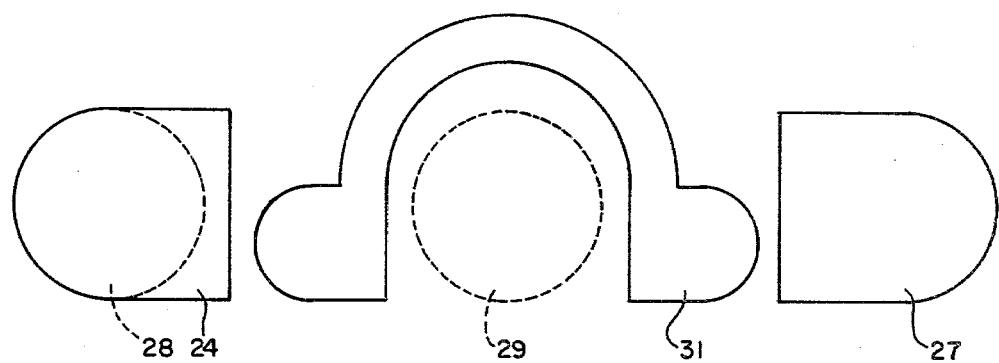

With reference to FIG. 3(c), the two inner openings 25 and 26 can be replaced by a, semicircular annular slat 31 which has sections corresponding to the two inner openings 25 and 26.

The three circular openings 21, 22, 23 can be replaced by a single opening 30 (cf FIG. 3), which is substantially circular in the center and to which are connected lateral oval halves with a smaller arc radius.

The centers of the three circular openings 21, 22, 23 as well as the centers of the semicircles or curvatures of the larger of the remaining four openings 24, 25, 26 and 27 are also located on the same latitude of the spherical plug. This latitude y related to the rotation axis a' passing through the operating rod 4 of spherical plug 5 corresponds to the latitude y related to the vertical axis b of the valve seat insert 2 and on which are located the centers of the circular inlets 28, 29 of the water supply pipes issuing into the valve seat. The spacing "n" of the centers N, N' of said inlets 28,29 is half the spacing "m" of the centers M, M' of the outer of the four openings 24, 25, 26, 27, namely 24 and 27. The openings 24, 25, 26, 27 are in each case homologously positioned in pairs 24, 27 and 25, 26 and in each case have a semi-circular narrow side.

After inserting spherical plug 5 in valve seat insert 2 and after inserting gasket 17 operating rod 4 can be aligned in such a way that the latitudes of the ball end openings 21 to 23 or 30 and 24 to 27 and the water supply openings 28, 29 coincide. By rotating the operating rod 4 about its longitudinal axis a' it is then possible to bring about a link between one and/or other of the two water inlets 28, 29 and one and/or other of the ball end openings. It is advantageous to rotate the operating rod 4 to such an extent that the larger of the three circular ball end openings 22 (for the centering of the one-piece ball end opening 30) coincides with one of the two inlets 28, 29. It must be ensured that it is then not possible to further rotate operating rod 4 about its longitudinal axis a'. In the present embodiment, this is ensured by the slotted disk 18 axially secured by cap nut 3, whose slot serves to laterally guide operating rod 4 and to protect the latter against rotation. After fitting the slotted disk 18 and screwing to its cap 14, operating rod 4 can only be pivoted in the direction of arrow c (or in the opposite direction) or rotated together with spherical plug 5 about rotation axis a'. Pivoting in the direction of arrow c (or in the reverse direction) leads to a change in the quantity of the liquid flowing into the spherical plug, while a rotation about rotation axis a' means that other ball end openings cooperate with one and/or the other of the two water inlets 28, 29 causing a change to the mixing ratio of the inflowing liquids.

The liquid flowing into spherical plug 5 passes through the plug and leaves it on the opposite side through one and/or the other of the plug openings provided and then through the discharge pipe 10 provided in valve seat insert 2, the following space 11 and the following pipes 12 and 13.

In the case of the mixing valve shown in FIG. 1 if its left-hand pipe union 8 (indicated by dotted lines) is connected to a hot water pipe and its right-hand pipe union (not shown in the drawing) is connected to a cold water pipe, a rotation of cap 14 and consequently a clockwise rotation of spherical plug 5 about rotation axis a' leads to a reduction in the mixing temperature of the outflowing water and a counterclockwise rotation leads to an increase in said temperature. However, if the left-hand pipe union 8 is connected to a cold water pipe and the right-hand pipe union to a hot water pipe, cap 14 must be turned to the right if the temperature of the outflowing water is to be increased and to the left if said temperature is to be reduced. To this extent, this mixing valve completely corresponds to the prior art valves. However, in the mixing valve according to the invention, it is possible with such a connection arrangement to retain the desired cap rotation direction without any significant technical effort and expenditure. For this, it is merely necessary to remove the spherical plug 5 from the valve seat insert 2 and then reinsert it displaced by 180°, so that the plug openings which hitherto served as a water outlet now serve as the water inlet. This is possible due to the fact that the spherical plug 5 has openings on two facing sides which, despite their symmetrical arrangement differ in number and arrangement from one another, so that the plane with respect to which said openings are symmetrically arranged passes in one case through one opening and in the other case between two openings. Thus, in the case of the insertion of the plug displaced by an angle of 180° this leads to an interchange of the inflow conditions to the inside of the plug. This reversal of the rotation direction is shown in FIGS. 3(a) and 3(b), wherein the upper part there is an even number of four inlets 24 to 27 and in the lower part an uneven number, i.e. a single inlet 30. Laterally, said inlet 30 has narrow extensions, which can be made to communicate with the water inlets 29, 28 of valve seat 2 shown in dotted line form. In both the diagrammatically shown situations the spherical plug is rotated clockwise about rotation axis a' (FIG. 1) until it abuts (viewed from the inside of the plug in the direction of inlets 28, 29 of valve seat 2). In the upper part, the left-hand opening 24 of the plug is opened and the right-hand cold water opening 29 is closed by the web between openings 25 and 26 of the plug. In the lower part, the cold water opening 29 is opened by the circular central part of opening 30, while the left-hand hot water opening 28 is closed by the plug wall.

Preferably, the rotatability of operating rod 4 is limited, so that it can only be rotated clockwise and counterclockwise by a given amount. According to a preferred embodiment of the mixing valve according to the invention, the operating rod 4 is at least zonally constructed in a cross-sectionally rhombic manner where it is guided in a slot provided e.g. in disk 18 and whose width substantially corresponds to the length of the smaller cross-sectional diagonal of operating rod 4. The center angle of the rhombus on the larger cross-sectional diagonal preferably corresponds to the rotation angle of operating rod 4.

Figure 4:
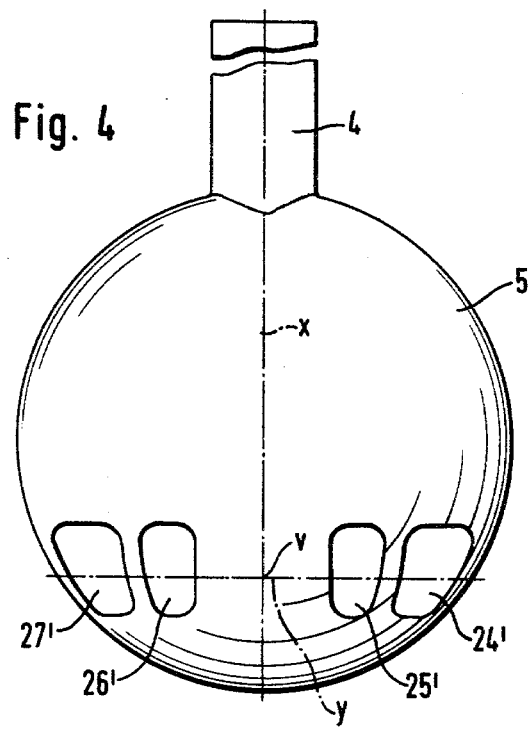
FIG. 4 is another embodiment of a spherical plug of a mixing valve according to the invention.
Figure 5:
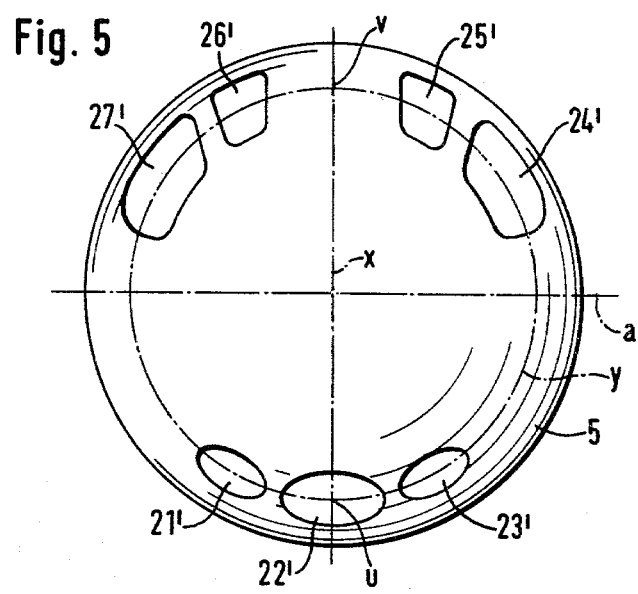
FIG. 5 is the spherical plug shown in FIG. 4 from below.

The spherical plug shown in FIGS. 4 and 5 differs from that of FIGS. 1 and 2 only through the shape of its openings 24' to 27' provided on one side thereof. Unlike the openings 24 to 27 of the plug in FIGS. 1 and 2, said openings 24' to 27' do not in each case have the shape of a horizontal rectangle, whose narrow side remote from the plane of symmetry x is substantially semicircular. Openings 24' to 27' have the shape of a trapezoid, with rounded angles. The remaining openings 21' to 23' of the plug of FIGS. 4 and 5 correspond both as regards shape and arrangement to the openings 21 to 23 of the spherical plug of FIGS. 1 and 2.

What is claimed is:

1. A mixing valve for liquids, comprising:
   a spherical plug having two sets of openings, one set having an even number of said openings and the other set having an odd number of said openings, the openings communicating with one another through the plug;
   a valve housing having a valve face adapted to the spherical plug;
   means for connecting a discharge pipe and two intake pipes for the liquids to be mixed through the valve face, to at least two of the openings of the spherical plug;
   an operating rod connected to the spherical plug by means of which the plug is pivotable for varying the quantity of the outflowing liquid and is rotatable about an operating rod axis for varying the mixing ratio of the inflowing liquids, the sets of openings of the spherical plug being arranged substantially on the same latitude of the plug with respect to the operating rod axis but on opposite sides thereof, the openings of each set being bilaterally symmetrical with respect to a plane of symmetry passing through the operating rod axis and at right angles to the pivot axis; and,
   an intermediate area on the side of the spherical plug having the even number of openings, traversed by the plane of symmetry and bounded longitudinally by the innermost openings of the even numbered set, the intermediate area being wider longitudinally than the internal diameter of one of the intake pipes issuing into the valve housing, whereby in a first set of operating positions the even numbered set of openings are inlet openings and the odd numbered set of openings are outlet openings, and in a second set of operating positions the even numbered set of openings are outlet openings and the odd numbered set of openings are inlet openings, such that when the spherical plug is displaced by 180° about the operating rod axis, the directions of rotational movement necessary for changing the mixing ratio are reversed.

2. A valve for mixing liquids from two intake pipes and discharging the mixed liquid through a discharge pipe, comprising:
   a spherical plug having two sets of latitudinally aligned openings, each set being symmetrical about a plane of symmetry and each set being disposed on opposite sides of the plug, the openings communicating with one another through the plug;
   an operating rod, defining an operating rod axis of rotation, connected to the plug for rotating and pivoting the plug, for controlling a mixing ratio and fluid discharge rate respectively; and,
   one of the sets of openings having an even number of openings and the other set having an odd number of openings, the odd numbered set having at least one opening traversed by the plane of symmetry and the even numbered set having at least two openings defining therebetween and intermediate area traversed by the plane of symmetry and wider than the inner diameter of at least one of the intake pipes, whereby in a first set of operating positions the even numbered set of openings are inlet openings and the odd numbered set of openings are outlet openings, and in a second set of operating positions the even numbered set of openings are outlet openings and the odd numbered set of openings are inlet openings, such that when the spherical plug is displaced by 180° about the operating rod axis the directions of rotational movement necessary for changing the mixing ratio are reversed.

3. A mixing valve according to claim 1 or 2, wherein the spherical plug is a substantially hollow sphere.

4. A mixing valve according to claims 1 or 2, wherein an opening on the side of the spherical plug with the odd number of openings, traversed by the plane of symmetry, is disposed opposite the intermediate area of the even numbered set of openings on the other side of the spherical plug.

5. A mixing valve according to claims 1 or 2, wherein the set with the even number of openings has at least two openings and the set with the odd number of openings has at least one opening.

6. A mixing valve according to claim 5, wherein the cross-sectional area of those openings of the set with the even number of openings disposed furtherest from the plane of symmetry along the latitude and the cross-sectional area of the opening of the set with the odd number of openings which is traversed by the plane of symmetry each corresponds at least to the cross-sectional area of each of the intake pipes issuing into the valve housing.

7. A mixing valve according to claims 1 or 2, wherein the openings in at least one of the sets are each circular.

8. A mixing valve according to claims 1 or 2, wherein the openings in at least one of the sets have in each case the shape of a horizontal rectangle, whose narrow side remote from the plane of symmetry is substantially semicircular.

9. A mixing valve according to claims 1 or 2, wherein the openings in at least one of the sets have the shape of a trapezoid with rounded corners.

10. A mixing valve according to claims 1 or 2, wherein those openings of the even numbered set positioned closest to the plane of symmetry are smaller than those openings more remote from the plane of symmetry.

11. A mixing valve according to claim 5, wherein the at least one opening of the odd numbered set traversed by the plane of symmetry is larger than other of the openings in the odd numbered set more remote from the plane of symmetry.

12. A mixing valve according to claims 1 or 2, wherein the set with the odd number of openings has only one opening, which has a substantially circular center and two lateral oval halves, each with a smaller arc radius than the center, connected thereto.

13. A mixing valve according to claim 5, wherein the even numbered set has four openings and of odd numbered set has three openings.

14. A mixing valve according to claim 7, wherein the circular openings are in the set with the odd number of openings.

15. A mixing valve according to claim 8, wherein the horizontal rectangular openings are in the set with the even number of openings.

16. A mixing valve according to claim 9, wherein the trapezoidally shaped openings are in the set with the even number of openings.

17. A mixing valve according to claim 2, further comprising means for limiting the rotational and pivotal movement of the plug to a zone of operation defined by the diameter and location of the at least two intake pipes.

18. A mixing valve according to claims 1 or 17, wherein at least a portion of the operating rod has a rhombic cross-section, and in this portion is guided in a slot, whose width substantially corresponds to the length of the smaller cross-sectional diagonal of the operating rod.

* * * * *

UNITED STATES PATENT AND TRADEMARK OFFICE
CERTIFICATE OF CORRECTION

PATENT NO. : 4,352,369

DATED : October 5, 1982

INVENTOR(S) : WERNER LORCH

It is certified that error appears in the above-identified patent and that said Letters Patent are hereby corrected as shown below:

Column 5, line 12, delete "The" and insert --With reference to Fig. 3(a), the--.

Column 5, line 19, delete the comma between "a" and "semicircular".

Column 5, line 19, "slat" should read --slot--.

Column 8, line 6, "and" should read --an--.

Signed and Sealed this

Twelfth Day of April 1983

[SEAL]

Attest:

Attesting Officer

GERALD J. MOSSINGHOFF

Commissioner of Patents and Trademarks